(12) United States Patent
Weddle et al.

(10) Patent No.: US 7,085,963 B2
(45) Date of Patent: Aug. 1, 2006

(54) METHOD FOR CONFIGURING A MULTIPLE CHANNEL DISCRETE OUTPUT MODULE

(75) Inventors: Alan Weddle, Watauga, TN (US); Stephen Weeks Mowry, Jr., Kingsport, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 574 days.

(21) Appl. No.: 10/366,892

(22) Filed: Feb. 12, 2003

(65) Prior Publication Data

US 2003/0226066 A1 Dec. 4, 2003

Related U.S. Application Data

(60) Provisional application No. 60/368,355, filed on Mar. 28, 2002, now abandoned.

(51) Int. Cl.
*G06F 11/00* (2006.01)

(52) U.S. Cl. .......................... 714/24; 700/19
(58) Field of Classification Search ................. 700/19; 714/24

See application file for complete search history.

(56) References Cited

U.S. PATENT DOCUMENTS

| 4,965,714 | A * | 10/1990 | Knecht .................. 700/82 |
| 6,256,293 | B1 * | 7/2001 | Gerstel et al. .......... 370/228 |
| 6,574,740 | B1 * | 6/2003 | Odaohhara et al. ..... 713/323 |
| 6,868,309 | B1 * | 3/2005 | Begelman ............... 700/273 |
| 2001/0043563 | A1 * | 11/2001 | Gerstel et al. .......... 370/228 |

FOREIGN PATENT DOCUMENTS

EP     0743529 A1 * 11/1996

* cited by examiner

*Primary Examiner*—Bryce P. Bonzo
*Assistant Examiner*—Michael Maskulinski

(57) ABSTRACT

Certain exemplary embodiments of the present invention provide a control system device, comprising a multiple channel discrete output module, said module storing a plurality of fail-state parameters, each fail-state parameter from the plurality of fail-state parameters corresponding to one channel of the multiple channels. Certain exemplary embodiments of the present invention provide a method for controlling the operation of each of a plurality of channels coupled to a discrete output module upon failure or shutdown of a control system coupled to the discrete output module, comprising, for each of the plurality of channels, storing a predetermined value for a fail-state parameter in a multi-channel discrete output module adapted to control the channel; and upon detecting a control system failure or shutdown, causing the channel to operate in a mode corresponding to the stored value for the channel's fail-state parameter. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope or meaning of the claims.

21 Claims, 4 Drawing Sheets

METHOD FOR CONFIGURING A MULTIPLE CHANNEL DISCRETE OUTPUT MODULE

CROSS-REFERENCE TO RELATED APPLICATIONS

This application claims priority to, and incorporates by reference herein in its entirety, the now abandoned provisional application Ser. No. 60/368,355, filed Mar. 28, 2002.

BACKGROUND

Control systems, such as for example, those utilizing programmable logic controllers (PLCs), can control a broad number and type of devices, including alarms, indicators, actuators, motors, relays, and even input devices, such as sensors. Often, a central processing unit (CPU) provides a control signal to an output module, which then provides a device control signal that is of a voltage appropriate to its particular device.

When a failure or shutdown of a typical control system, PLC, and/or CPU occurs, the output modules are deactivated, and their device control signals forced to zero voltage. Yet, a zero volt or lack of control signal is not necessarily a safe state for all controlled devices. That is, forcing a device control signal to zero might not leave the controlled device in a safe operating state. For example, to keep a certain space safely ventilated, a fan might need to keep operating, even when its control system fails or shuts down. Yet, if the control signal to the fan disappears, drops to a zero voltage, etc., the fan will also shut down.

SUMMARY

Certain exemplary embodiments of the present invention provide a control system device, comprising a multiple channel discrete output module, said module storing a plurality of fail-state parameters, each fail-state parameter from the plurality of fail-state parameters corresponding to one channel of the multiple channels.

Certain exemplary embodiments of the present invention provide a method for controlling the operation of each of a plurality of channels coupled to a discrete output module upon failure or shutdown of a control system coupled to the discrete output module, comprising, for each of the plurality of channels, storing a predetermined value for a fail-state parameter in a multi-channel discrete output module adapted to control the channel; and upon detecting a control system failure or shutdown, causing the channel to operate in a mode corresponding to the stored value for the channel's fail-state parameter.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

Certain exemplary embodiments of the present invention can provide a control system device, such as a multiple channel discrete output module. The output module can store a plurality of fail-state parameters. Each of the stored fail-state parameters can correspond to one channel of the multiple channels. As used herein with the word "device" or "module", the phrase "discrete output" is only capable of causing a circuit controlled thereby to be in either a full voltage state or a no voltage state, with no ability to cause the circuit to operate in an intermediate voltage state. As used herein, a "multiple channel" or "multi-channel" discrete output module is capable of controlling a voltage on each of a plurality of independent channels. That is, such a module can simultaneously control a voltage on a first channel to either about 5 volts or about 0 volts, on a second channel to either about 120 volts or about 0 zero volts, and on a third channel to about 240 volts or about 0 volts.

Figure 1:
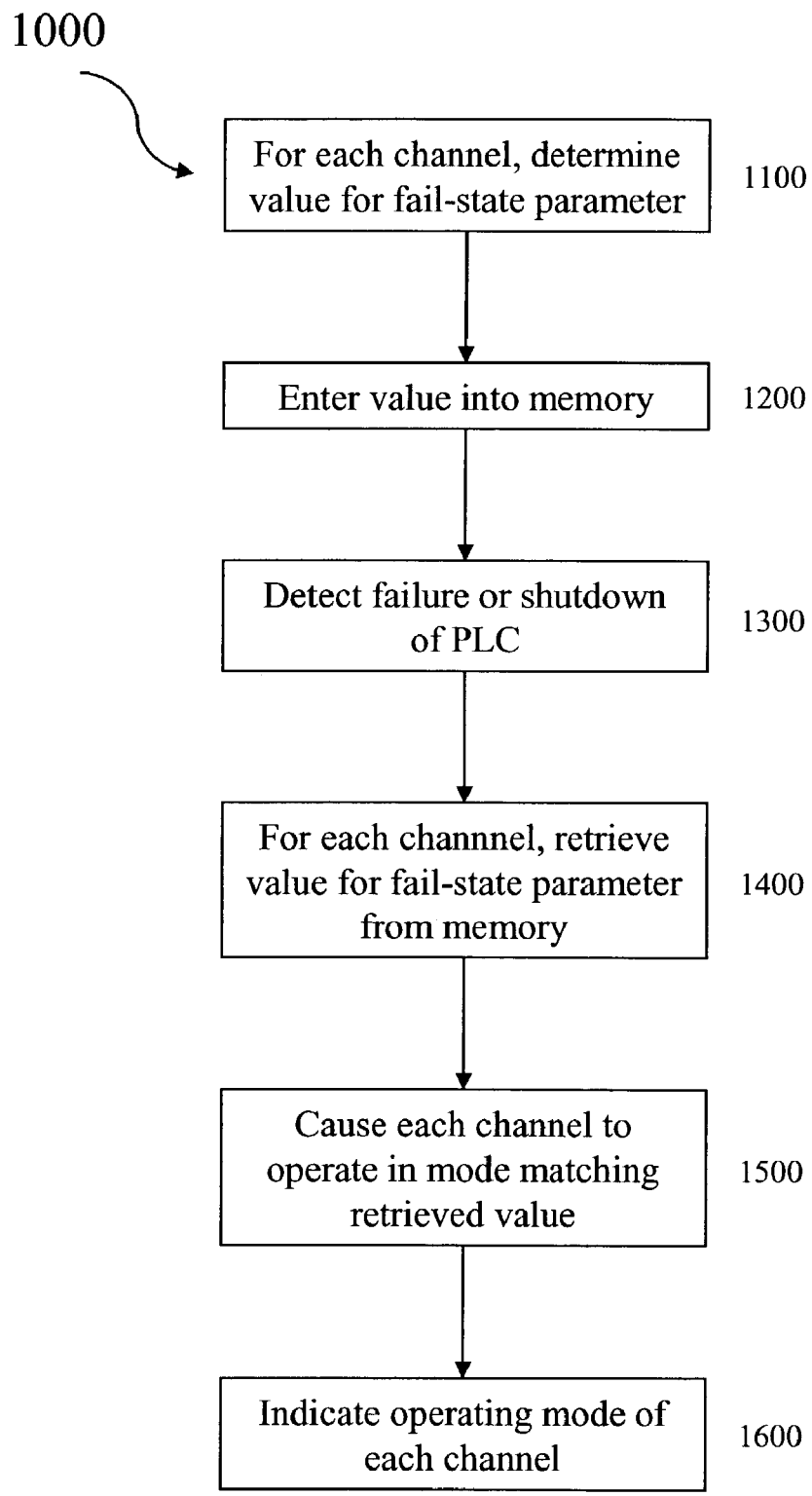
FIG. 1 is a flow diagram of an exemplary embodiment of a method 1000 of the present invention.

FIG. 1 is a flow diagram of an exemplary embodiment of a method 1000 of the present invention. Note that although various activities are presented in a numbered sequence, and are connected with arrows to an exemplary embodiment of method 1000, there is no general requirement that the activities be performed in any particular order or any particular number of times, or that all activities be performed. Moreover, any activity can be performed automatically and/or manually.

At activity 1100, for each channel of a multiple channel discrete output module, a value for a fail-state parameter of the controlled device can be determined. At activity 1200, the determined value can be entered into and stored in a memory of the multiple channel discrete output module. Thus, the memory can contain numerous single-channel-dedicated fail-state parameter values.

At activity 1300, the multiple channel discrete output module can detect a failure or shutdown of the control system, the programmable logic controller, and/or a central processing unit. In certain embodiments, the multiple channel discrete output module can detect a failure of a signal and/or an error in the signal from the control system, the programmable logic controller, and/or a central processing unit. In certain embodiments, the output module can correct the error, acknowledge the signal, and/or further process the signal.

At activity 1400, the multiple channel discrete output module can, for each of its channels, or at least several of its multiple channels, retrieve the stored value of the fail-state parameter from the memory of the multiple channel discrete output module, and/or from a memory coupled thereto. In certain embodiments, the multiple channel discrete output module can process, analyze, and/or interpret the stored value.

At activity 1500, the multiple channel discrete output module can cause each channel to operate in a mode matching the retrieved fail-state value for that channel. That is, for each of the controlled channels, the multiple channel discrete output module can send a device control signal to the controlled device, the device control signal corresponding to the stored value of the fail-state parameter. Thus, the multiple channel discrete output module can cause each channel to operate in a mode corresponding to the module-stored value for the channel's fail-state parameter.

In certain embodiments, the multiple channel discrete output module can control a supply of alternating current (AC) and/or direct current (DC) to the controlled device. In certain embodiments, the multiple channel discrete output module can control an upper AC supply voltage of about 20 volts to about 240 volts, and every value and range therebetween. In certain embodiments, the multiple channel discrete output module can control an upper DC supply voltage of about 20 volts to about 240 volts, and every value and range therebetween.

At activity 1600, the multiple channel discrete output module can indicate the device control signal sent to the controlled device, a status of each channel, and/or an operating mode of each channel. The indication can be provided visually, such as via a lamp, light, strobe, LED, OLED, LCD, display, monitor, electric paper, flag, etc., and/or audibly, such as via a horn, annunciator, beeper, whistle, speaker, siren, etc.

In certain embodiments, the multiple channel discrete output module can communicate information regarding the device control signal, a status of each channel, and/or an operating mode of each channel, for example, to the control system, PLC, and/or CPU.

In certain embodiments, the multiple channel discrete output module can communicate other information regarding the device control signal, a status of each channel, and/or an operating mode of each channel. For example, the output module can communicate an open-circuit status and/or a short-circuit status of a channel.

Thus, the multiple channel discrete output module can configure and control each of the multiple channels coupled thereto independently of each of the other channels.

Figure 2:
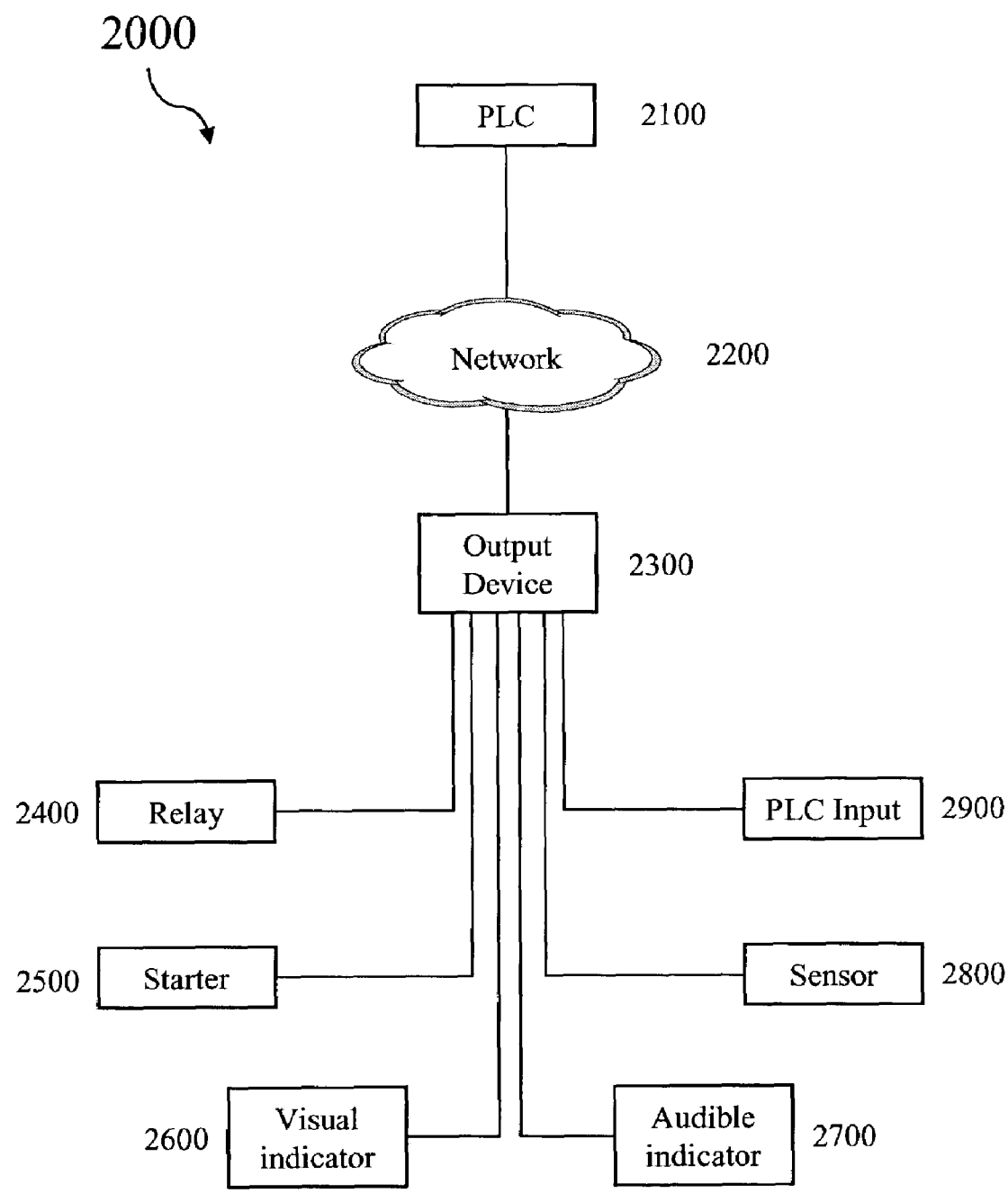
FIG. 2 is a block diagram of an exemplary embodiment of a system 2000 of the present invention.

FIG. 2 is a block diagram of an exemplary embodiment of a system 2000 of the present invention. As an initial matter, it suffices to say that, using the description of method 1000, one of ordinary skill in the art can implement the functionality of method 1000 via system 2000 utilizing any of a wide variety of well-known architectures, hardware, protocols, and/or software. Thus, the following description of system 2000 can be viewed as illustrative, and unless specified otherwise, should not be construed to limit the implementation of method 1000 and/or the scope of any claims attached hereto.

System 2000 can comprise a control system, programmable logic controller (PLC), and/or central processing unit 2100, which can be coupled via a network 2200 to output device and/or module 2300, such as a multiple channel discrete output module. Network 2200 can be a wired and/or wireless connection and/or communication network, such as for example, a packet switched network, a connectionless network, an IP network, the Internet, a non-POTS network, and/or a non-PSTN network. By way of further example, network 2200 can be an IEEE 802.03 wired Ethernet network, an 802.11 wireless network, a wireless serial network, a Bluetooth network, an Ultra Wide Band (UWB) network, an X-10 network, an electrical power network, etc.

In certain embodiments, output device 2300 can include at least one opto-coupler, detector, processor, memory, relay, SCR, FET, and/or network interface.

Via its multiple output channels 2350, output device 2300 can be coupled to and/or control various controlled devices, such as a relay 2400, a starter, motor control center, and/or actuator 2500, visual indicator 2600 (e.g., a lamp, light, strobe, LED, OLED, LCD, display, monitor, electric paper, flag, etc.), an audible indicator 2700 (e.g., a horn, annunciator, beeper, whistle, speaker, siren, etc.), a sensor 2800 (e.g., a sensor of pressure, temperature, flow, mass, heat, light, sound, humidity, proximity, position, velocity, vibration, voltage, current, capacitance, resistance, inductance, electromagnetic radiation, etc.), and/or input device 2900 to CPU 2100.

Figure 3:
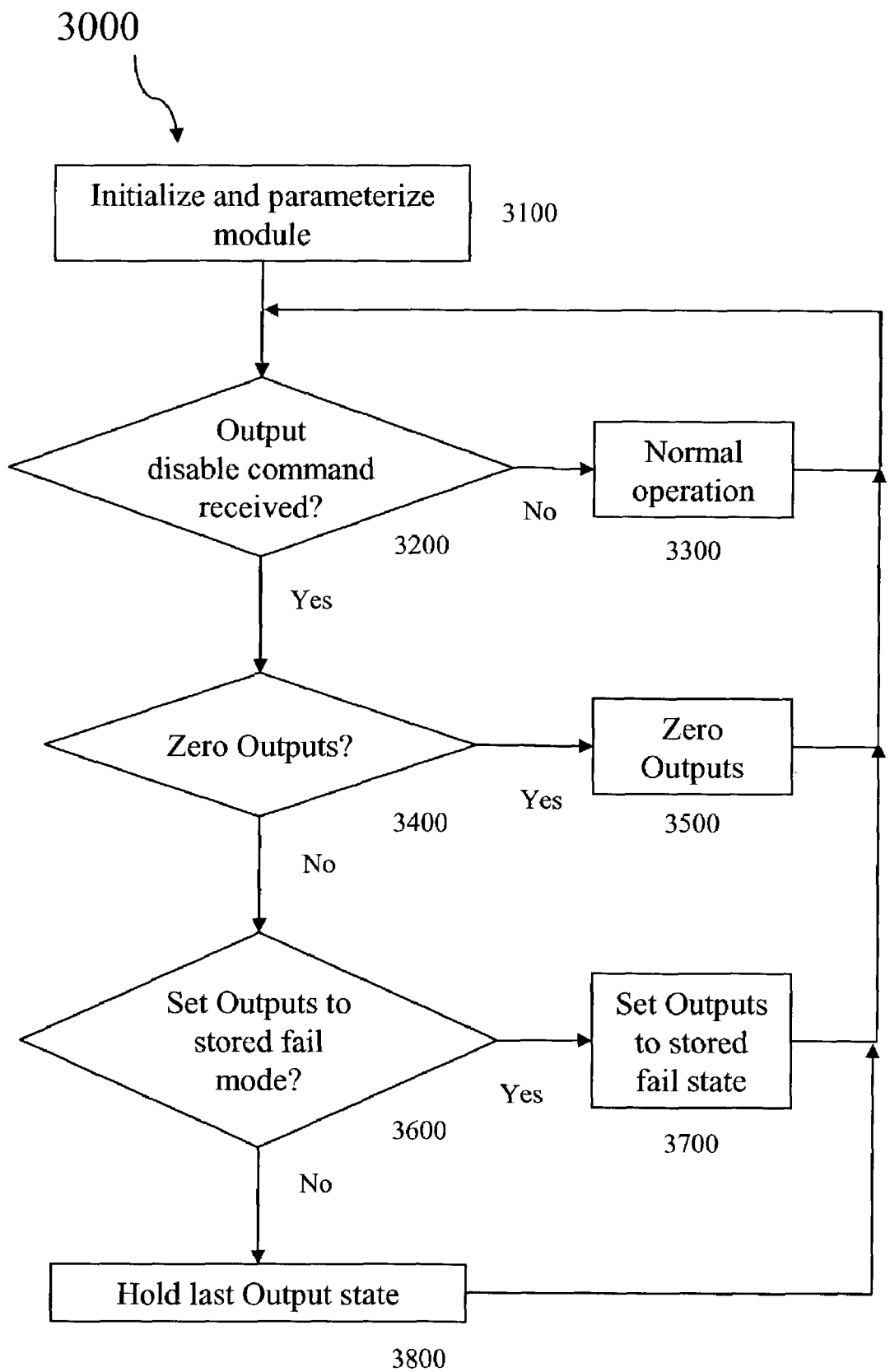
FIG. 3 is a flow diagram of an exemplary embodiment of a method 3000 of the present invention.

FIG. 3 is a flow diagram of an exemplary embodiment of a method 3000 of the present invention. Note that although various activities are presented in a numbered sequence, and are connected with arrows to an exemplary embodiment of method 3000, there is no general requirement that the activities be performed in any particular order or any particular number of times, or that all activities be performed. Moreover, any activity can be performed automatically and/or manually.

At activity 3100, the output module can be initialized and parameterized. That is, values for the fail-state parameter can be determined, entered into a memory of the output module, and the module activated. In certain embodiments, a user can determine the values for one or more fail-state parameters, and provide them to the control system, PLC, and/or CPU (the word "CPU" will be used for the remainder of the description of method 3000, yet in various embodiments the word "control system" and/or "PLC" can be substituted for "CPU"). In certain embodiments, upon start-up of the module, the determined values can be communicated to the module from the CPU.

If the CPU detects a fault condition, it can check for a proper error handler to help it recover from the error without halting program execution. If this error handler is not available or cannot properly handle the error, the CPU can enter a Stop state, which can cause an Output Disable command to all output modules.

At activity 3200, the module can determine whether it has received an "Output Disable" command (or the like), whether it has detected a communication failure with the CPU, whether the CPU has failed, and/or whether the CPU has shutdown. If not, at activity 3300, the module can continue with its normal control operation.

If so, at activity 3400, the module can determine whether it should zero all of its outputs. If so, at activity 3500, the module can provide a zero voltage on each of its channels. If not, at activity 3600, the module can determine whether it should set any of its outputs (i.e., channels) to a mode corresponding to a stored value for a fail-state parameter for that output.

If so, at activity 3700, the module can set each such output to the operating mode corresponding to the stored fail-state. If not, at activity 3800, the module can hold the channel to the last output state that the module was providing for that channel.

Figure 4:
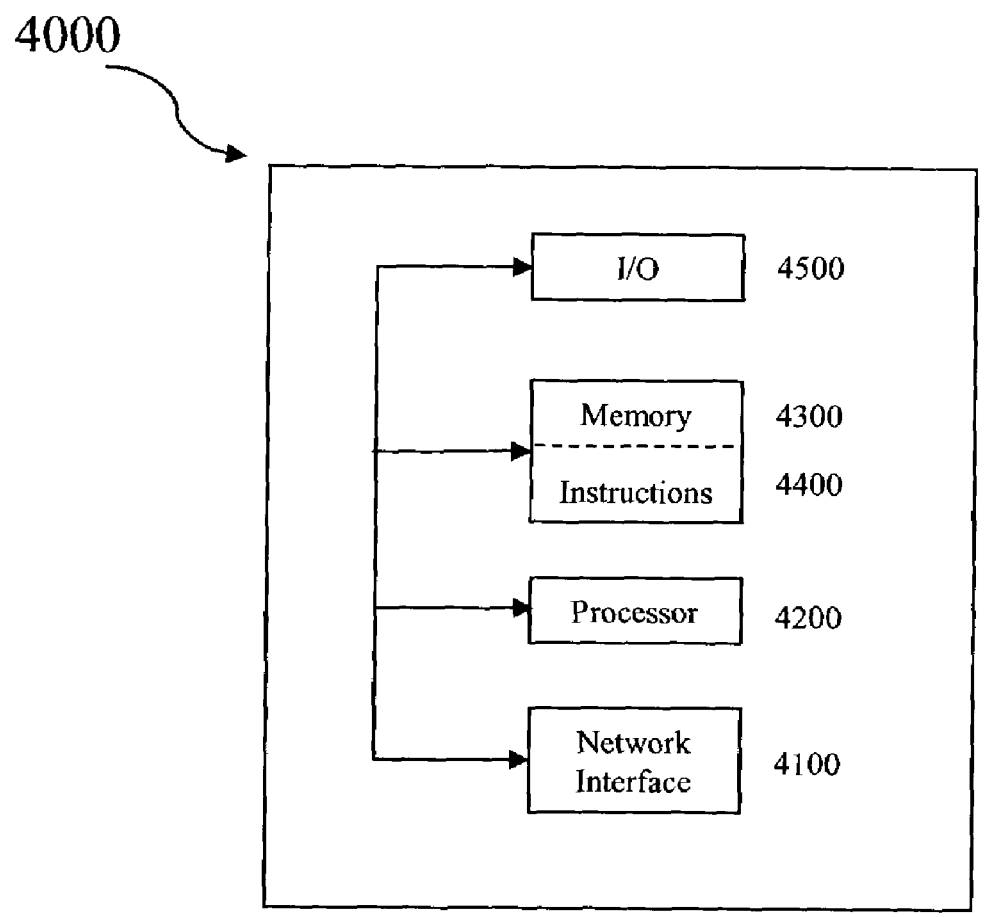
FIG. 4 is a block diagram of an exemplary embodiment of an output device 4000 of the present invention.

FIG. 4 is a block diagram of an exemplary embodiment of an output device 4000 of the present invention.

Output device 4000 can include well-known components such as one or more communication interfaces 4100, one or more processors 4200, one or more memories 4300 containing instructions 4400, and/or one or more input/output (I/O) devices 4500, etc.

In various embodiments, communication interface 4100 can be and/or include a bus, connector, network adapter, wireless network interface, wired network interface, modem, radio receiver, transceiver, and/or antenna, etc.

Each processor 4200 can be a commercially available general-purpose microprocessor. In certain embodiments, the processor can be an Application Specific Integrated Circuit (ASIC) or a Field Programmable Gate Array (FPGA) that has been designed to implement in its hardware and/or firmware at least a part of a method in accordance with an embodiment of the present invention.

Memory 4300 can be coupled to processor 3200 and can comprise any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof. Memory 4300 can also comprise a database, an archive, and/or any stored data and/or instructions. For example, memory 4300 can store instructions 4400 adapted to be executed by processor 4200 according to one or more activities of a method of the present invention.

Instructions 4400 can be embodied in software, which can take any of numerous forms that are well known in the art. Instructions 4400 can control operation of output device 4000 and/or one or more other devices, systems, or subsystems coupled thereto.

I/O device 4500 can be an audio and/or visual device, including, for example, a monitor, display, indicator, light, keyboard, keypad, touchpad, pointing device, microphone, speaker, telephone, fax, video camera, camera, scanner, and/or printer, including a port to which an I/O device can be attached, connected, and/or coupled.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A method for controlling operation of each of a plurality of channels coupled to a multi-channel discrete output module upon failure or shutdown of a control system coupled to the discrete output module, comprising:
    for each of a plurality of channels coupled to a multi-channel discrete output module, storing a predetermined value for a fail-state parameter in a memory of the multi-channel discrete output module;
    detecting a failure or shutdown of a control system coupled to the multi-channel discrete output module; and
    upon detecting a failure or shutdown of the control system, for each of the plurality of channels:
        retrieving the predetermined value for the fail-state parameter from the memory of the multi-channel discrete output module;
        interpreting the predetermined value for the fail-state parameter;
        causing the channel to operate in a mode corresponding to the interpreted predetermined value for the channel's fail-state parameter; and
        visually indicating an operating mode of the channel.

2. The method of claim 1, further comprising, for each channel, determining the value for the fail-state parameter.

3. The method of claim 1, further comprising detecting a failure of the control system.

4. The method of claim 1, further comprising detecting a shutdown of the control system.

5. The method of claim 1, further comprising detecting an error in a signal from the control system.

6. The method of claim 1, further comprising:
    correcting an error in a signal from the control system.

7. The method of claim 1, further comprising acknowledging a signal from the control system.

8. The method of claim 1, further comprising, for each channel, retrieving the predetermined value for the fail-state parameter from a memory of the module.

9. The method of claim 1, further comprising, for each channel, interpreting the predetermined value for the fail-state parameter.

10. The method of claim 1, further comprising, indicating an operating mode of a channel.

11. The method of claim 1, further comprising, for each channel, indicating an operating mode of the channel.

12. The method of claim 1, further comprising, for each channel, audibly indicating an operating mode of the channels.

13. The method of claim 1, further comprising, communicating to the control system regarding a channel from the plurality of channels.

14. The method of claim 1, further comprising,
    communicating to the control system regarding all channels from the plurality of channels.

15. The method of claim 1, further comprising, communicating an operating mode of a channel to the control system.

16. The method of claim 1, further comprising,
    communicating an open-circuit status of a channel.

17. The method of claim 1, further comprising,
    communicating a short-circuit status of a channel.

18. A method for controlling the operation of each of a plurality of channels coupled to a discrete output module upon failure or shutdown of a control system coupled to the discrete output module, comprising: for each of the plurality of channels,
    storing a predetermined value for a fail-state parameter in a multi-channel discrete output module adapted to control the channel;
    upon detecting a control system failure or shutdown, causing the channel to operate in a mode corresponding to the stored value for the channel's fail-state parameter; and
    visually indicating an operating mode of the channel.

19. A system for controlling the operation of each of a plurality of channels coupled to a discrete module upon failure or shutdown of a control system coupled to the discrete module, comprising:
    for each of the plurality of channels,
    means for storing a predetermined value for a fail-state parameter in a multi-channel discrete output module adapted to control the channel; and
    means for upon detecting a control system failure or shutdown, causing the channel to operate in a mode corresponding to the channel's fail-state parameter; and
    p1 means for visually indicating an operating mode of the channel.

20. A computer-readable medium containing instructions for activities comprising:
    for each of a plurality of channels coupled to a discrete module that is coupled to a control system,
        storing a predetermined value for a fail-state parameter in a multi-channel discrete output module adapted to control the channel;
        upon detecting a control system failure or shutdown by the discrete module, causing the channel to operate in a mode corresponding to the channel's fail-state parameter; and
        visually indicating an operating mode of the channel.

21. A method for controlling the operation of each of a plurality of channels coupled to a discrete output module upon failure or shutdown of a control system coupled to the discrete output module, comprising:
    detecting a failure or shutdown of the control system;
    for each of the plurality of channels, upon detecting a failure or shutdown of the control system,
        causing the channel to operate in a mode corresponding to a predetermined module-stored value for the channel's fail-state parameter; and
        visually indicating an operating mode of the channel.

* * * * *